(12) United States Patent
Dong et al.

(10) Patent No.: US 11,740,772 B2
(45) Date of Patent: Aug. 29, 2023

(54) METHOD AND APPARATUS FOR CONTROLLING HOTSPOT RECOMMENDATION POP-UP WINDOW, AND MEDIUM AND ELECTRONIC DEVICE

(71) Applicant: BEIJING BYTEDANCE NETWORK TECHNOLOGY CO., LTD., Beijing (CN)

(72) Inventors: Zesong Dong, Beijing (CN); Huijun Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/696,790

(22) Filed: Mar. 16, 2022

(65) Prior Publication Data

US 2022/0317836 A1 Oct. 6, 2022

Related U.S. Application Data

(63) Continuation of application No. PCT/CN2020/114792, filed on Sep. 11, 2020.

(30) Foreign Application Priority Data

Sep. 17, 2019 (CN) .......................... 201910877332.0

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/0485* (2013.01);
(Continued)

(58) Field of Classification Search
CPC .... G06F 3/0484; G06F 3/0482; G06F 3/0485; G06F 3/0488; G06F 2203/04804; H04N 21/4316; H04N 21/4725
See application file for complete search history.

(56) References Cited

U.S. PATENT DOCUMENTS

| 10,860,181 | B1 * | 12/2020 | Iyer | ..................... G06F 3/04845 |
| 2012/0179967 | A1 * | 7/2012 | Hayes | ................... G06F 3/0485 |
| | | | | 715/863 |

(Continued)

FOREIGN PATENT DOCUMENTS

| CN | 105204865 A | 12/2015 |
| CN | 105468409 A | 4/2016 |

(Continued)

OTHER PUBLICATIONS

International Patent Application No. PCT/CN2020/114792; Int'l Search Report; dated Dec. 16, 2020; 3 pages.

(Continued)

*Primary Examiner* — Nicholas Ulrich
(74) *Attorney, Agent, or Firm* — BakerHostetler

(57) ABSTRACT

A method and device for controlling a hotspot recommendation pop-up window, a computer-readable medium and an electronic device are provided. On reception of a pop-up window display instruction, a pop-up window including prompt options corresponding to multiple hotspots is displayed on the hot video playing page. In a case that the pop-up window is displayed on the hot video playing page, a first control on the hot video playing page except for the pop-up window is set to a disabled state. Further, the user can select among the prompt options corresponding to multiple hotspots included in the pop-up window.

18 Claims, 10 Drawing Sheets

(51) Int. Cl.
  *G06F 3/0485*    (2022.01)
  *H04N 21/4725*   (2011.01)
  *H04N 21/431*    (2011.01)
  *G06F 3/0488*    (2022.01)

(52) U.S. Cl.
  CPC ....... *G06F 3/0488* (2013.01); *H04N 21/4316* (2013.01); *H04N 21/4725* (2013.01); *G06F 2203/04804* (2013.01)

(56) References Cited

U.S. PATENT DOCUMENTS

| | | | |
|---|---|---|---|
| 2013/0110772 | A1 | 5/2013 | Svendsen |
| 2013/0339857 | A1* | 12/2013 | Garcia Bailo ........ G06F 3/0484 715/723 |
| 2014/0380380 | A1* | 12/2014 | Heller ................ H04N 21/4725 725/58 |
| 2015/0026728 | A1* | 1/2015 | Carter .............. H04N 21/47815 725/43 |
| 2015/0106856 | A1* | 4/2015 | Rankine ............. H04N 21/8456 725/60 |
| 2020/0134320 | A1* | 4/2020 | Crossley ................ G06V 20/20 |

FOREIGN PATENT DOCUMENTS

| | | | | |
|---|---|---|---|---|
| CN | 304005603 | S | 1/2017 | |
| CN | 107205081 | A | 9/2017 | |
| CN | 107256121 | A | 10/2017 | |
| CN | 108984081 | A | 12/2018 | |
| CN | 110620949 | A | 12/2019 | |
| JP | 2007-036526 | A | 2/2007 | |
| JP | 2012-230660 | A | 11/2012 | |
| JP | 2018-137629 | A | 8/2018 | |
| WO | WO-2017096953 | A1 * | 6/2017 | ......... H04N 21/4725 |
| WO | WO 2018/183125 | A1 | 10/2018 | |

OTHER PUBLICATIONS

"Aiming at "interactive video", Weishi shows new skills on the short video track"; https://www.sohu.com/a/307663678_536272; Apr. 2019; accessed Mar. 15, 2022; 15 pags.

Zhang Yu-quan et al.; Design and implementation of mobile web game based on Cocos2d-JS; Electronic Design Engineering; vol. 25 No. 16; Aug. 2017; p. 121-124 (contains English Abstract).

Kuwana et al.; "Line & Instagram & Twitter & Facebook & TikTok Easy-to-understand book from scratch"; Mar. 2019; p. 281 (contains English Translation).

* cited by examiner

METHOD AND APPARATUS FOR CONTROLLING HOTSPOT RECOMMENDATION POP-UP WINDOW, AND MEDIUM AND ELECTRONIC DEVICE

The present application is a continuation of International Patent Application No. PCT/CN2020/114792, filed on Sep. 11, 2020, which claims priority to Chinese Patent Application No. 201910877332.0, titled "METHOD AND APPARATUS FOR CONTROLLING HOTSPOT RECOMMENDATION POP-UP WINDOW, AND MEDIUM AND ELECTRONIC DEVICE", filed on Sep. 17, 2019 with the State Intellectual Property Office of People's Republic of China, both of which are incorporated herein by reference in their entireties.

FIELD

The present disclosure relates to a method and device for controlling a hotspot recommendation pop-up window, a computer-readable medium and an electronic device.

BACKGROUND

Pop-up windows are often used in display pages of electronic devices to display content that can be displayed in a current interface and does not need to be displayed all the time. When a pop-up window is displayed, it is usually required to process only elements on the screen that are covered by the pop-up window in a current display interface, to enable the user to operate the pop-up window normally, and it is unnecessary to process the elements in other positions that are not covered by the pop-up window which may cause the display interface to be cluttered when the pop-up window pops up. The display interface includes both the display content in the pop-up window and the display content in the original display interface, thus the user cannot focus on the content in the pop-up window, resulting a bad experience of the user on the effect of the pop-up window. Further, when performing interaction operations such as clicking a prompt option or inputting, the effect of the pop-up window may be affected due to a mis-operation on other elements other than the pop-up window.

SUMMARY

This Summary part is provided to introduce concepts in a simplified form, which will be described in detail in the following detailed description part. This summary part is not intended to identify key features or essential features of the claimed technical solution, nor is it intended to be used to limit the scope of the claimed technical solution.

In a first aspect, a method for controlling a hotspot recommendation pop-up window is provided according to the present disclosure, which includes: receiving a pop-up window display instruction, where the pop-up window display instruction is generated in response to a click instruction received in a more hotspot prompt area on a hot video playing page; displaying a pop-up window on the hot video playing page, where the pop-up window includes prompt options each of which corresponds to a hotspot; setting a first control on the hot video playing page except for the pop-up window to a disabled state, where the first control includes a video control for playing a hot video on the hot video playing page, an interaction control and a display control for displaying information of the hot video; and playing, on reception of a selection instruction from a user to select a target hotspot from the prompt options, a hot video in the target hotspot by using the video control on the hot video playing page.

In a second aspect, a device for controlling a hotspot recommendation pop-up window is provided according to the present disclosure, which includes a first receiving module, a display module, a disabling module, and a playing module. The first receiving module is configured to receive a pop-up window display instruction, where the pop-up window display instruction is generated in response to a click instruction received in a more hotspot prompt area on a hot video playing page. The display module is configured to display a pop-up window on the hot video playing page, where the pop-up window includes prompt options each of which corresponds to a hotspot. The disabling module is configured to set a first control on the hot video playing page except for the pop-up window to a disabled state, where the first control includes a video control for playing a hot video on the hot video playing page, an interaction control and a display control for displaying information of the hot video. The playing module is configured to play, on reception of a selection instruction from a user to select a target hotspot from the prompt options, a hot video in the target hotspot by using the video control on the hot video playing page.

In a third aspect, a computer-readable medium is provided according to the present disclosure, which includes a computer program stored thereon. The computer program, when executed by a processing device, performs steps of the method described in the first aspect.

In a fourth aspect, an electronic device is provided according to the present disclosure, which includes a storage device and a processing device. The storage device is configured to store a computer program. The processing device is configured to execute the computer program in the storage device, to perform steps of the method described in the first aspect.

With the above technical solutions, on reception of a pop-up window display instruction, a pop-up window including prompt options corresponding to multiple hotspots is displayed on the hot video playing page. In a case that the pop-up window is displayed on the hot video playing page, a first control on the hot video playing page except for the pop-up window is set to a disabled state, so that the user will not trigger other interactive operations independent of the pop-up window by mistakenly clicking on the first control other than the pop-up window. In this way, the user can fully focus on the content in the pop-up window when the pop-up window pops up, greatly improving the recommendation effect of the pop-up window, thus greatly improving the user experience. Further, the user can select among the prompt options corresponding to multiple hotspots included in the pop-up window, so that the video control on the hot video playing page can play the hot video in the target hotspot corresponding to the prompting option selected by the user. In this way, when watching hot videos in multiple hotspots, without having to jump among multiple pages, the user only needs to select a hotspot according to the prompt options displayed in the pop-up window on the hot video playing page.

Other features and advantages of the present disclosure will be described in detail in the following detailed description part.

BRIEF DESCRIPTION OF THE DRAWINGS

The above and other features, advantages and aspects of embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale. In the drawings.

DETAILED DESCRIPTION OF EMBODIMENTS

Figure 1:
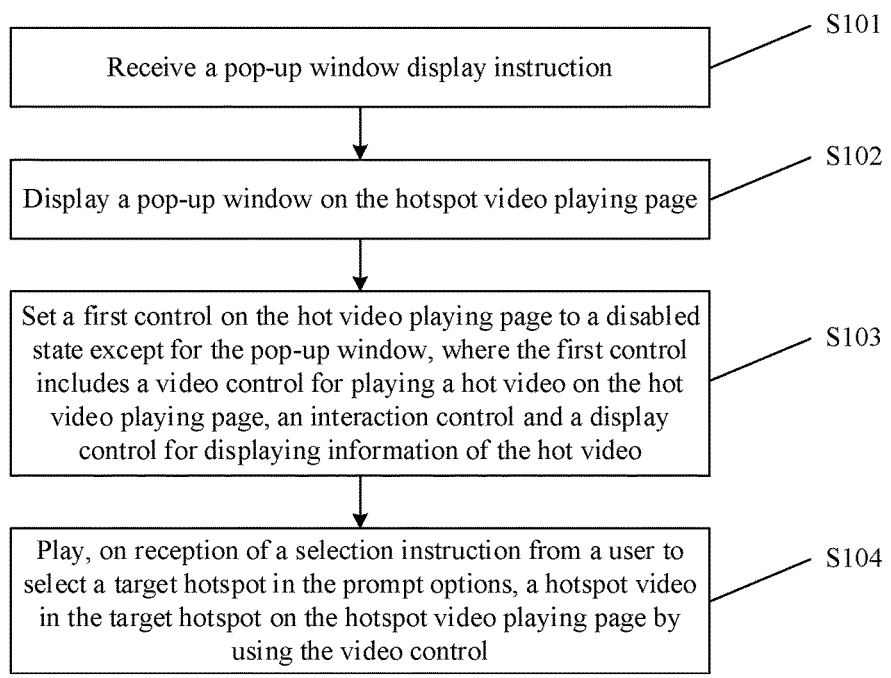
FIG. 1 is a flowchart of a method for controlling a hotspot recommendation pop-up window according to an embodiment of the present disclosure.

Embodiments of the present disclosure will be described in more detail below with reference to the drawings. Although certain embodiments of the present disclosure are shown in the drawings, it should be understood that the present disclosure may be embodied in various forms and should not be construed as limited to the embodiments set forth herein, but rather are provided for the purpose of more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit the illustrated steps. The scope of the present disclosure is not limited in this regard.

The term "including" and variations thereof are inclusive, that is, "including but not limited to". The term "based on" means "based at least in part on". The term "one embodiment" means "at least one embodiment", the term "another embodiment" means "at least one another embodiment", the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the definitions "a", "multiple" and "a plurality" mentioned in the present disclosure are illustrative rather than restrictive, and those skilled in the art should understand that unless the context clearly indicates otherwise, they should be understood as "one or more of".

The names of messages or information exchanged between multiple devices in the embodiments of the present disclosure are only for illustrative purposes, and are not intended to limit the scope of these messages or information.

FIG. 1 is a flowchart of a method for controlling a hotspot recommendation pop-up window according to an embodiment of the present disclosure. As shown in FIG. 1, the method includes steps S101 to S104.

Figure 2A:
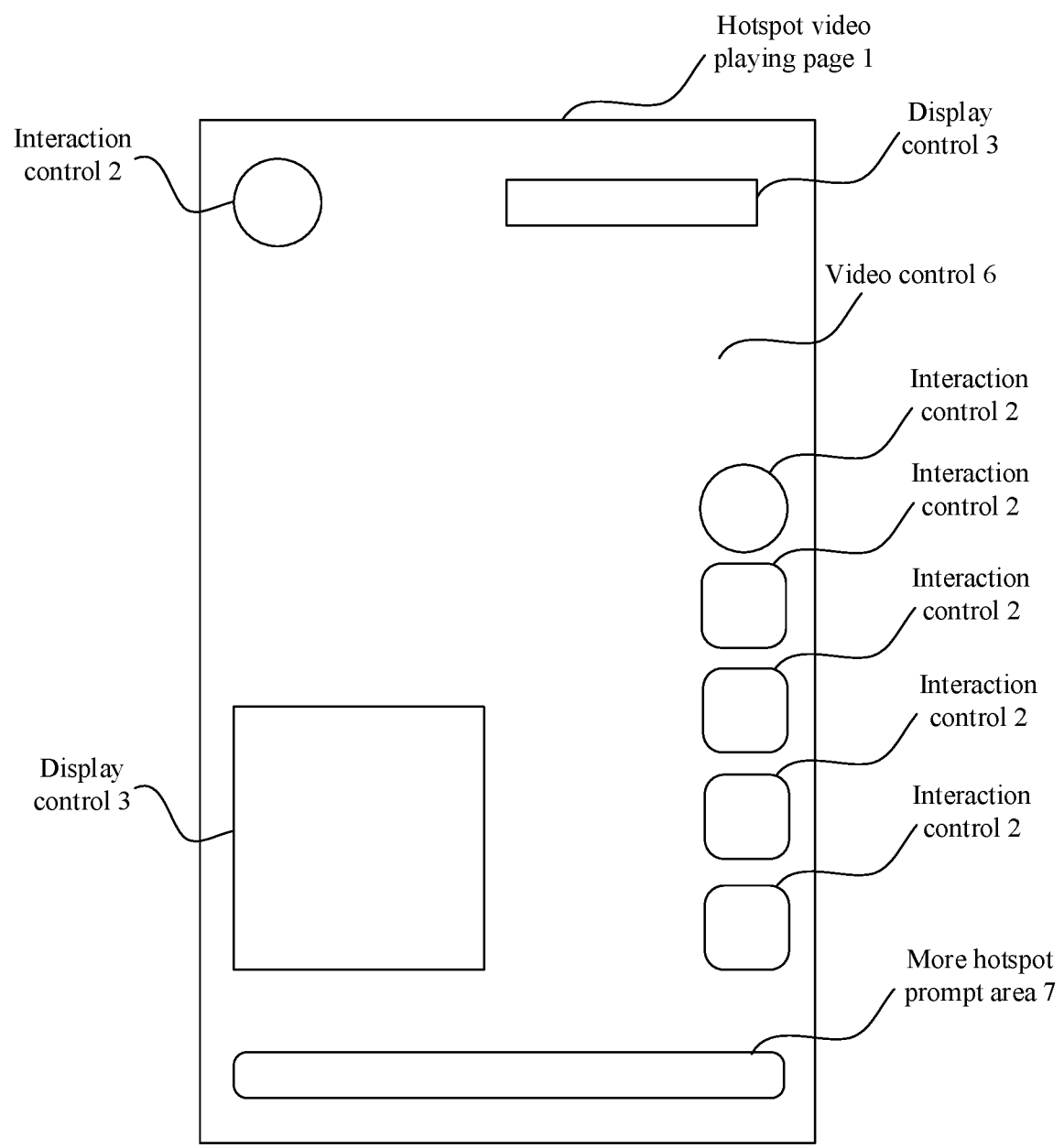
FIG. 2a is a schematic diagram of a hot video playing page without displaying a pop-up window in a method for controlling a hotspot recommendation pop-up window according to an embodiment of the present disclosure.

In step S101, a pop-up window display instruction is received, and the pop-up window display instruction is generated in response to a click instruction received in a more hotspot prompt area on the hot video playing page. The user may trigger the pop-up window display instruction by clicking on a more hotspot prompt area on the hot video playing page. The more hotspot prompting area may be as shown in FIG. 2a, which is a schematic diagram of a hot video playing page 1 without displaying a pop-up window according to an embodiment of the present disclosure, and a more hotspot prompting area 7 is located at the bottom of the hot video playing page 1. In a case that the user enters the hot video playing page 1, the pop-up window may be displayed on the hot video playing page 1 by clicking on the more hotspot prompt area 7 by the user.

In an embodiment, text content corresponding to the hotspots displayed in the pop-up window may also be displayed in a circular manner in the more hotspot prompt area 7 in the context form, so that the user can obtain information of the hotspots that can be played on the hot video playing page before clicking on the more hotspot prompting area 7 to pop up a pop-up window.

In step 102, a pop-up window is displayed on the hot video playing page, where the pop-up window includes prompt options corresponding to multiple hotspots. The prompt options may be displayed in the pop-up window in a horizontally scrolled manner or a vertically scrolled manner. The prompt option includes a video prompt screen or text prompt content corresponding to the hotspot. For example, if each prompt option is a video prompt screen corresponding to a hotspot, the prompt option may be displayed in a horizontally scrolled manner in the pop-up window, so that the user can make all the video prompt screens corresponding to all the hotspots in the pop-up window displayed in the pop-up window on the video playing page by sliding left and right in the pop-up window. If each prompt option refers to a text prompting content corresponding to a hotspot, the prompt option may be displayed in a vertically scrolled manner in the pop-up window, so that the user can make all the text prompt contents corresponding to all the hotspots in the pop-up window displayed in the pop-up window on the video playing page by sliding up and down in the pop-up window.

In step 103, a first control on the hot video playing page except the pop-up window is set to a disabled state, where the first control includes a video control for playing hot video on the hot video playing page, an interaction control, and a display control for displaying information of the hot video.

As shown in FIG. 2a, when the pop-up window is not displayed on the hot video playing page 1, the hot video playing page 1 includes a first control, where the first control includes a video control 6 for playing a hot video on the hot video playing page, an interaction control 2, and a display control 3 for displaying information of the hot video. When the user operates the interaction control 2 through operations such as clicking, an interactive effect will be produced, such as commenting on the video, praising the video, pausing the video. The display control 3 is usually used to display a certain preset content to the user, the area where the video control 6 is located may occupy the entire hot video playing page 1, or occupy a part of the hot video playing page 1. The area where the video control 6 is located in FIG. 2a occupies the entire hot video playing page 1, and other controls on the hot video playing page 1 may be distributed on the hot video playing page 1 in the form of covering the video control 6. The video control 6 may also perform certain interaction operations.

Figure 2B:
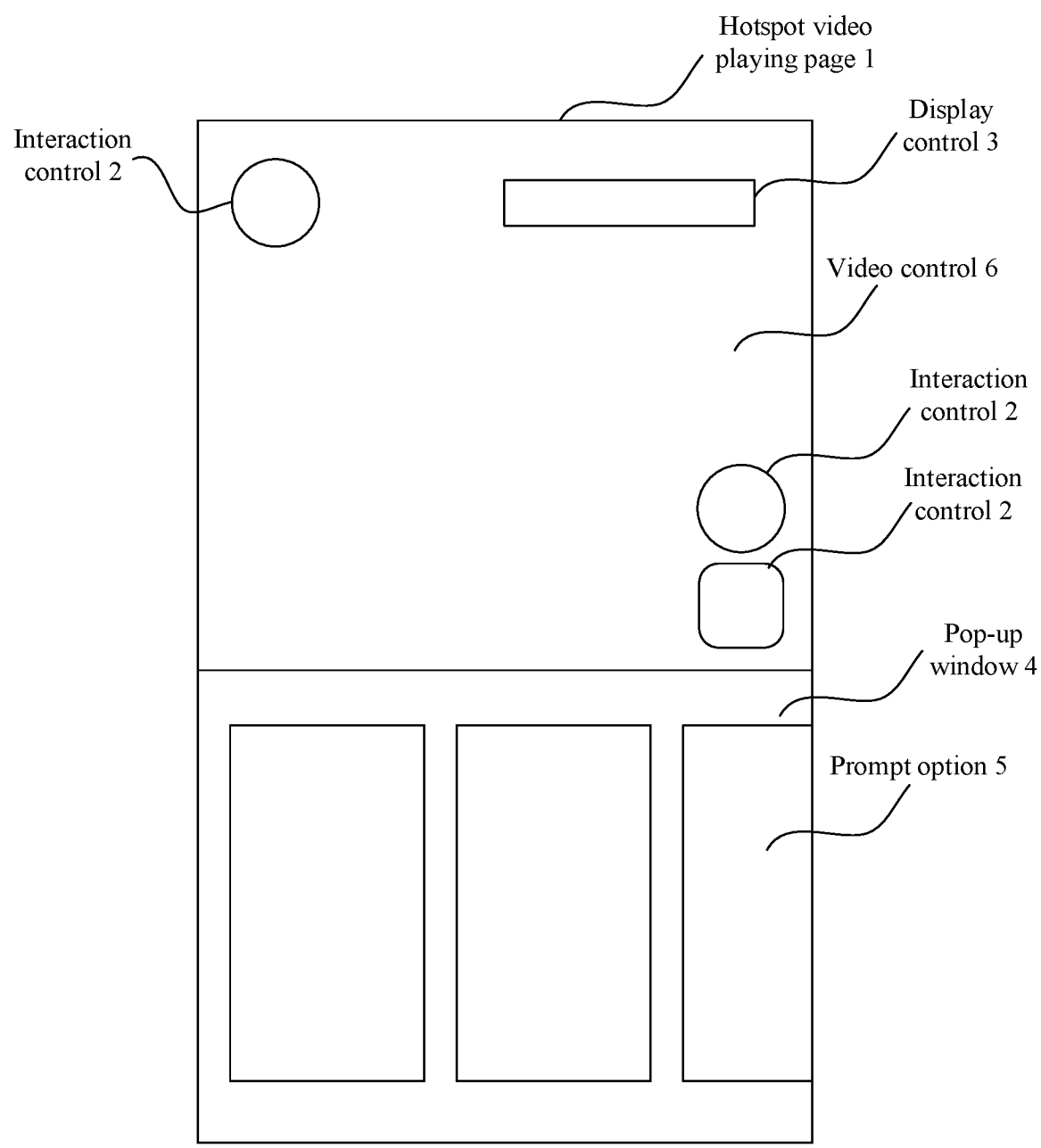
FIG. 2b is a schematic diagram of a hot video playing page displaying a pop-up window in a method for controlling a hotspot recommendation pop-up window according to an embodiment of the present disclosure.

After the pop-up window is displayed on the hot-spot video playing page in response to the pop-up window display instruction, the effect of the hot-spot video playing page may be as shown in FIG. 2b. The pop-up window 4 includes the prompt option 5, and the pop-up window 4 covers a part of the first control on the hot video playing page. According to the operation of step 103, all other controls except the pop-up window 4 (including the prompt option 5) on the hot video playing page 1, that is, the first control, are set to the disabled state, that is, even if the user performs an interaction operation such as clicking on the first control such as the interaction control 2 or the video control 6, which is not covered by the pop-up window 4 in FIG. 2b, the original interaction effect of the interaction control 2 or the video control 6 cannot be triggered, and the user can only perform an interaction operation on the prompt option 5 in the pop-up window 4 or the controls in other area in the pop-up window 4.

In step 104, on reception of a selection instruction from the user to select a target hotspot in the prompt options, a hot video in the target hotspot is played on the hot video playing page by using the video control. In a case that the pop-up window is displayed on the hot video playing page in response to the pop-up window display instruction, the user may perform a selection operation such as clicking on the prompt options corresponding to multiple hotspots displayed in the pop-up window, so as to select a target hotspot from the multiple hotspots. The video control in the video playing page may play the hot video in the target hotspot according to the target hotspot selected by the user.

With the above technical solutions, on reception of a pop-up window display instruction, a pop-up window including prompt options corresponding to multiple hotspots is displayed on the hot video playing page. In a case that the pop-up window is displayed on the hot video playing page, a first control on the hot video playing page except for the pop-up window is set to a disabled state, so that the user will not trigger other interactive operations independent of the pop-up window by mistakenly clicking on the first control other than the pop-up window. In this way, the user can fully focus on the content in the pop-up window when the pop-up window pops up, greatly improving the recommendation effect of the pop-up window, thus greatly improving the user experience. Further, the user can select among the prompt options corresponding to multiple hotspots included in the pop-up window, so that the video control on the hot video playing page can play the hot video in the target hotspot corresponding to the prompting option selected by the user. In this way, when watching hot videos in multiple hotspots, without having to jump among multiple pages, the user only needs to select a hotspot according to the prompt options displayed in the pop-up window on the hot video playing page.

Figure 3:
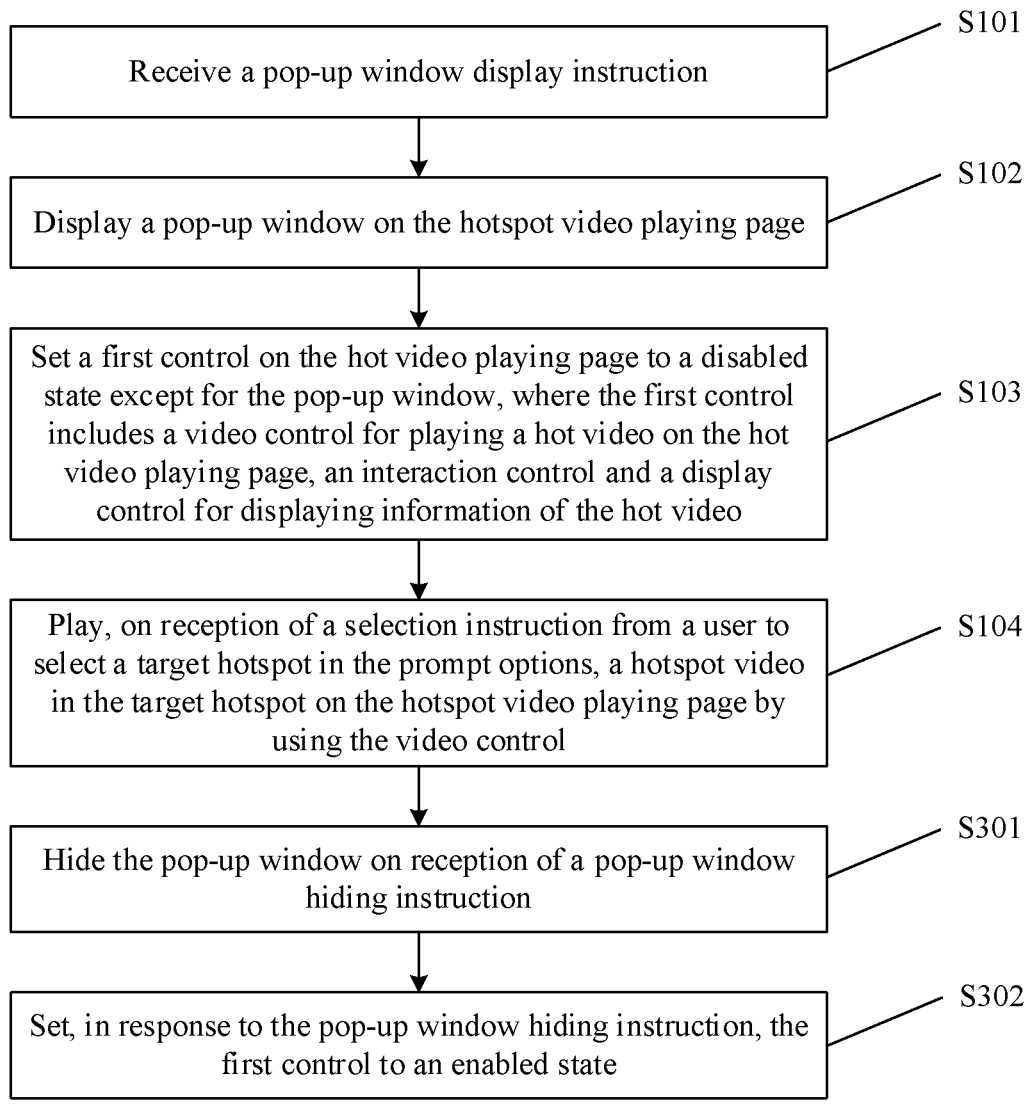
FIG. 3 is a flowchart of a method for controlling a hotspot recommendation pop-up window according to another embodiment of the present disclosure.

FIG. 3 is a flowchart of a method for controlling a hotspot recommendation pop-up window according to another embodiment of the present disclosure. As shown in FIG. 3, the method further includes step S301 and step S302.

In step 301, on reception of a pop-up window hiding instruction, the pop-up window is hidden, and the pop-up window hiding instruction is generated in response to a click instruction received on the first control in the disabled state, or generated in response to a preset gesture instruction received in the pop-up window. That is, in a case that the pop-up window is displayed on the hot video playing page, the user inputs the pop-up window hiding instruction by clicking the first control that is in the disabled state, or inputs a preset gesture instruction in the pop-up window to trigger the pop-up window hiding instruction. On reception of the pop-up window hiding instruction, the pop-up window is hidden in response to the pop-up window hiding instruction. The hot video playing page after the pop-up window is hidden may be as shown in FIG. 2a, which is the same as the video hotspot playing page before the pop-up window pops up.

In step 302, in response to the pop-up window hiding instruction, the first control is set to an enabled state. On reception of the pop-up window hiding instruction, if the pop-up window is hidden, the first control in the disabled state except the pop-up window on the hot video playing page is set to the enabled state, so as to restore interaction operations of the user on all elements on the hot video playing page.

Figure 4:
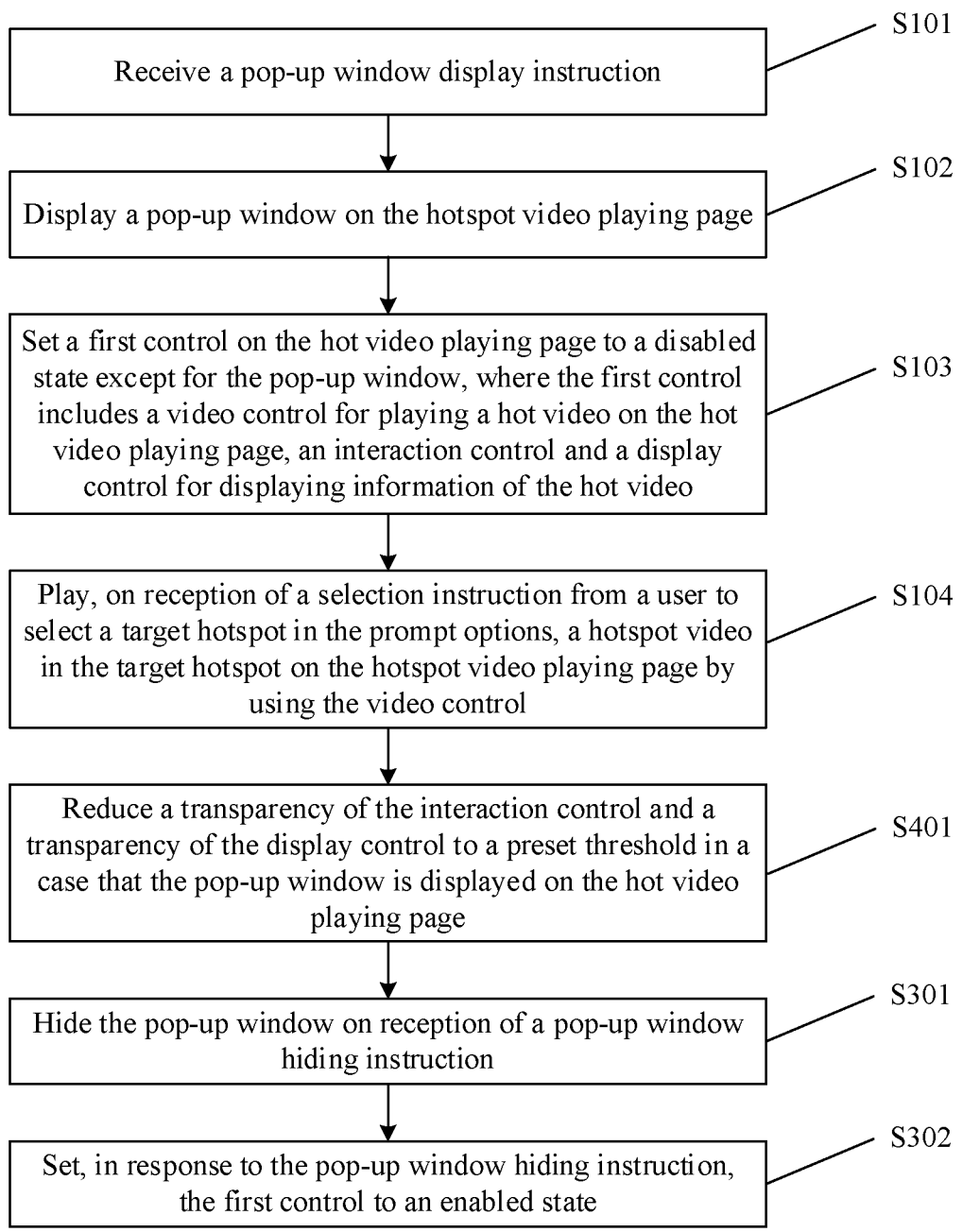
FIG. 4 is a flowchart of a method for controlling a hotspot recommendation pop-up window according to another embodiment of the present disclosure.

FIG. 4 is a flowchart of a method for controlling a hotspot recommendation pop-up window according to an embodiment of the present disclosure. As shown in FIG. 4, the method further includes step S401.

In step 401, in a case that the pop-up window is displayed on the hot video playing page, a transparency of the interaction control and a transparency of the display control are reduced to a preset threshold.

Figure 5:
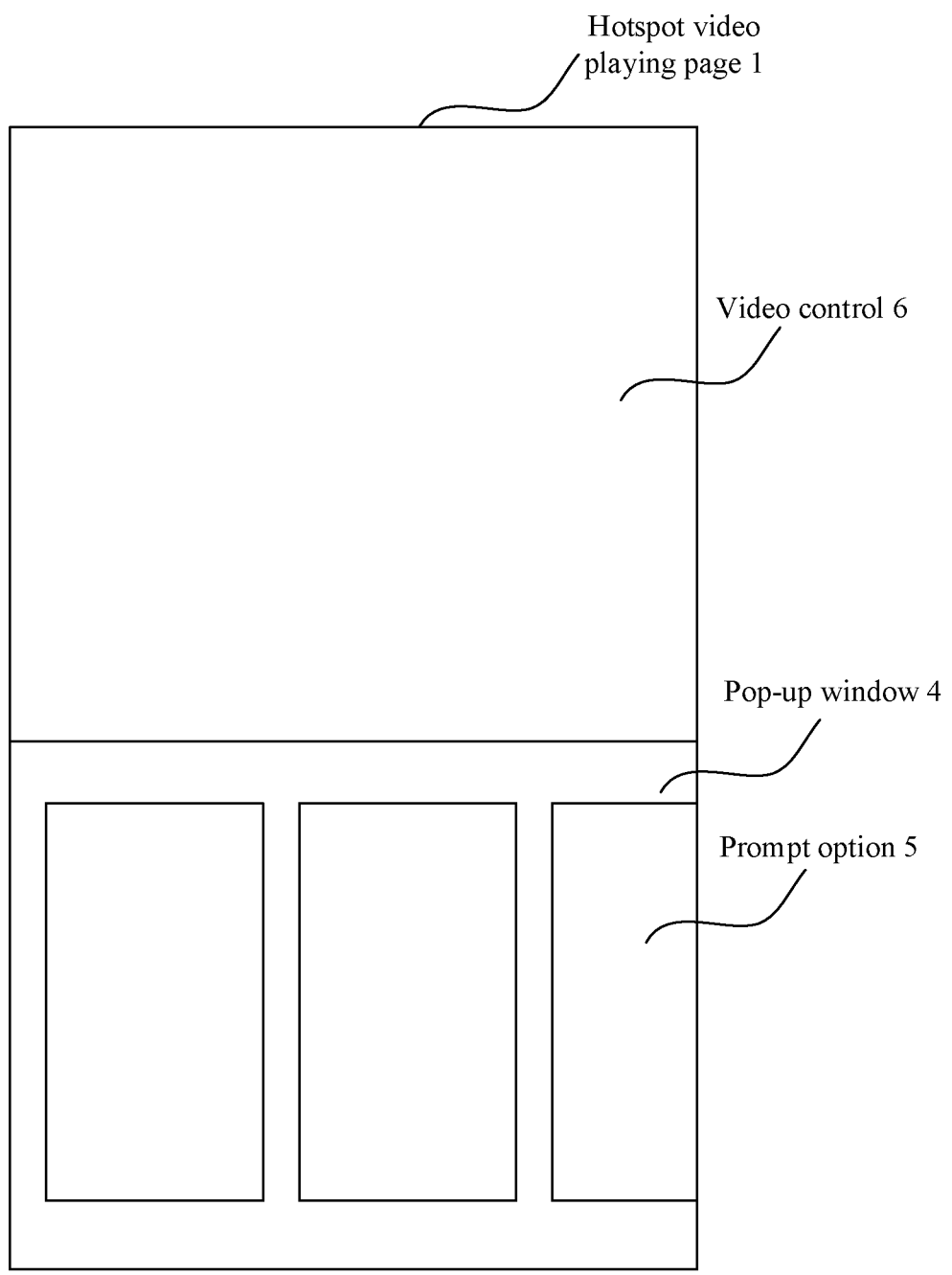
FIG. 5 is a schematic diagram of a hot video playing page displaying a pop-up window in a method for controlling a hotspot recommendation pop-up window according to another embodiment of the present disclosure.

The preset threshold may or may not be zero. In a case that the preset threshold is zero, a state of the hot video playing page after step S401 is performed may be as shown in FIG. 5. In FIG. 5, on the hot video playing page 1, the user may only see the video control 6 and the pop-up window 4, where the video control 6 is used to play a hot video to be played on the hot video playing page 1. If the area where the video control 6 is located also includes the area where the pop-up window 4 is located, the pop-up window 4 will cover the video control 6 in the area where the pop-up window 4 is located, that is, the user can only see the pop-up window 4 (including the prompt option 5) and a part of the video control 6 that is not covered by the pop-up window 4 on the hot video playing page 1. In a case that the preset threshold is not zero, on the hot video playing page after step S401 is performed, the user can still see the first control and the pop-up window, but the display state of the interaction control and the display control in the first control looks more transparent that the display state of the pop-up window, the content in the pop-up window, and the hot video being played in the video control, so as to visually weak the visibility of the interaction control and the display control, which enables the user to pay more attention to the hot video played by the video control and the content in the pop-up window. Both the interaction control and the display control may be reduced to have the same preset threshold, or to have different preset thresholds according to the actual situation.

Figure 6:
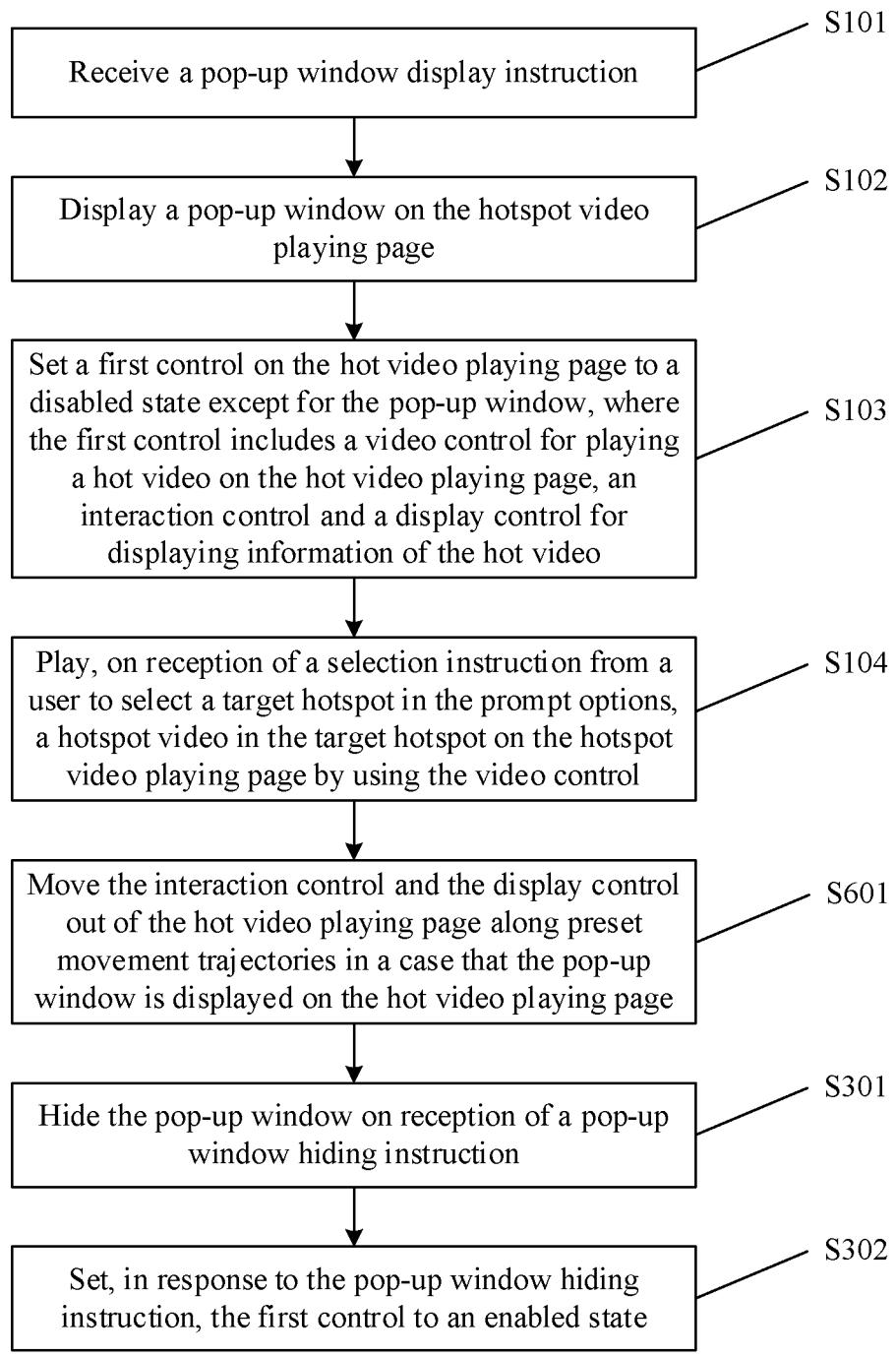
FIG. 6 is a flowchart of a method for controlling a hotspot recommendation pop-up window according to another embodiment of the present disclosure.

FIG. 6 is a flowchart of a method for controlling a hotspot recommendation pop-up window according to an embodiment of the present disclosure. As shown in FIG. 6, the method further includes step S601.

In step 601, in a case that the pop-up window is displayed on the hot video playing page, the interaction control and the display control are moved out of the hot video playing page along their preset movement trajectories. For example, on the hot video playing page 1 shown in FIG. 2a, the circular interaction control 2 at the top of the hot video playing page 1 may be moved linearly toward the left border of the hot video playing page 1 to a preset position outside the hot video playing page 1, so that the circular interaction control 2 is not visible within the hot video playing page 1, and the square display control 3 at the top of the hot video playing page 1 may also be moved along a straight trajectory toward an upper border of the hot video playing page 1 to another preset position outside the hot video playing page 1, so that the square display control page 3 is not visible within the hot video playing page 1.

With the above technical solution, in a case that the pop-up window is displayed on the hot video playing page, the user cannot interact with the first control on the hot video playing page except for the pop-up window, avoiding triggering an interaction operation independent of the pop-up window by the user due to mis-operations. In addition, on the hot video playing page, the user cannot see the interaction control and/or display control outside the pop-up window, or the visibility of the interaction control and/or display control on the hot video playing page is weakened to a certain extent, which not only enables the user to focus on the pop-up window when performing interaction operations, but also reduces visual interference to a great extent, further enabling the user to focus on the content in the pop-up window, bring a better experience to the user when using the pop-up window.

In an embodiment, the method further includes: controlling, on reception of a preset sliding-up gesture instruction on the video control when the pop-up window is hidden, the video control to play a last hot video in a hotspot to which a currently played hot video belongs; and/or controlling, on reception of a preset sliding-down gesture instruction on the video control when the pop-up window is hidden, the video control to play a next hot video in the hotspot to which the currently played hot video belongs. In a case that the pop-up window is hidden, the user may switch the hot video in the currently played hotspot by inputting the preset sliding-up gesture instruction or the preset sliding-down gesture instruction. For example, if the currently played hotspot includes 10 hot videos, and a second hot video is being played on the hot video playing page, the user may switch to a first hot video in the hotspot by entering the preset sliding-up gesture instruction, or switch to a third hot video in the hotspot by entering the preset sliding-down gesture instruction. In addition, if a last hot video in the hotspot is being played, and the user inputs the preset sliding-down gesture instruction, it may be jumped to a next hotspot and play the hot video in the next hotspot, or the user may also be prompted by a preset prompting manner that the last hot video in the current hotspot is being played.

Figure 7:
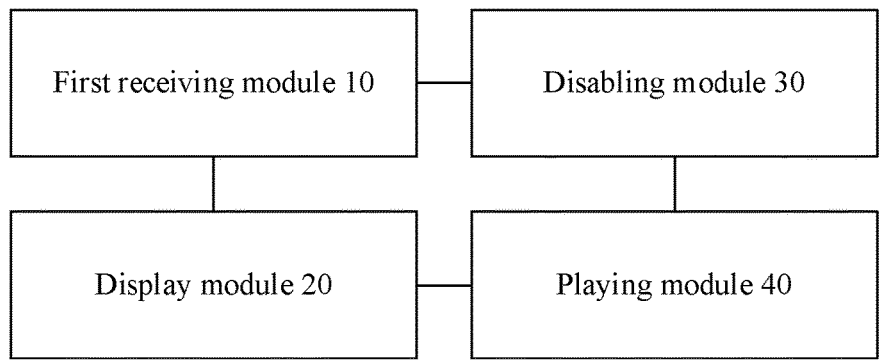
FIG. 7 is a structural block diagram of a device for controlling a hotspot recommendation pop-up window according to an embodiment of the present disclosure.

FIG. 7 is a structural block diagram of a device for controlling a hotspot recommendation pop-up window according to an embodiment of the present disclosure. As shown in FIG. 7, the device includes: a first receiving module 10, a display module 20, a disabling module 30 and a playing module 40. The first receiving module 10 is configured to receive a pop-up window display instruction, where the pop-up window display instruction is generated in response to a click instruction received in a more hotspot prompt area on a hot video playing page. The display module 20 is configured to display a pop-up window on the hot video playing page, where the pop-up window includes prompt option each of which corresponds to a hotspot. The disabling module 30 is configured to set a first control on the hot video playing page except for the pop-up window to a disabled state, where the first control includes a video control for playing a hot video on the hot video playing page, an interaction control and a display control for displaying information of the hot video. The playing module 40 is configured to play, on reception of a selection instruction from a user to select a target hotspot in the prompt options, a hot video in the target hotspot by using the video control on the hot video playing page.

With the above technical solutions, on reception of a pop-up window display instruction, a pop-up window including prompt options corresponding to multiple hotspots is displayed on the hot video playing page. In a case that the pop-up window is displayed on the hot video playing page, a first control on the hot video playing page except for the pop-up window is set to a disabled state, so that the user will not trigger other interactive operations independent of the pop-up window by mistakenly clicking on the first control other than the pop-up window. In this way, the user can fully focus on the content in the pop-up window when the pop-up window pops up, greatly improving the recommendation effect of the pop-up window, thus greatly improving the user experience. Further, the user can select among the prompt options corresponding to multiple hotspots included in the pop-up window, so that the video control on the hot video playing page can play the hot video in the target hotspot corresponding to the prompting option selected by the user. In this way, when watching hot videos in multiple hotspots, without having to jump among multiple pages, the user only needs to select a hotspot according to the prompt options displayed in the pop-up window on the hot video playing page.

Figure 8:
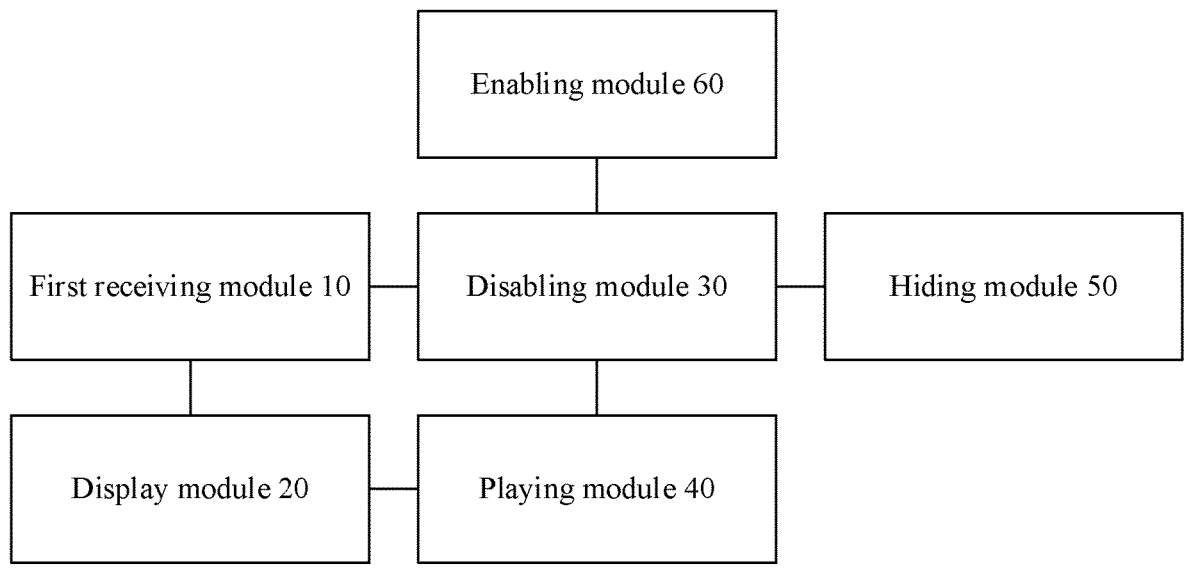
FIG. 8 is a structural block diagram of a device for controlling a hotspot recommendation pop-up window according to another embodiment of the present disclosure.

FIG. 8 is a structural block diagram of a device for controlling a hotspot recommendation pop-up window according to another embodiment of the present disclosure. As shown in FIG. 8, the device further includes: a hiding module 50 and enabling module 60. The hiding module 50 is configured to hide the pop-up window on reception of a pop-up window hiding instruction, where the pop-up window hiding instruction is generated in response to a click instruction received on the first control in the disabled state, or generated in response to a preset gesture instruction received in the pop-up window. The enabling module 60 is configured to set, in response to the pop-up window hiding instruction, the first control to an enabled state.

Figure 9:
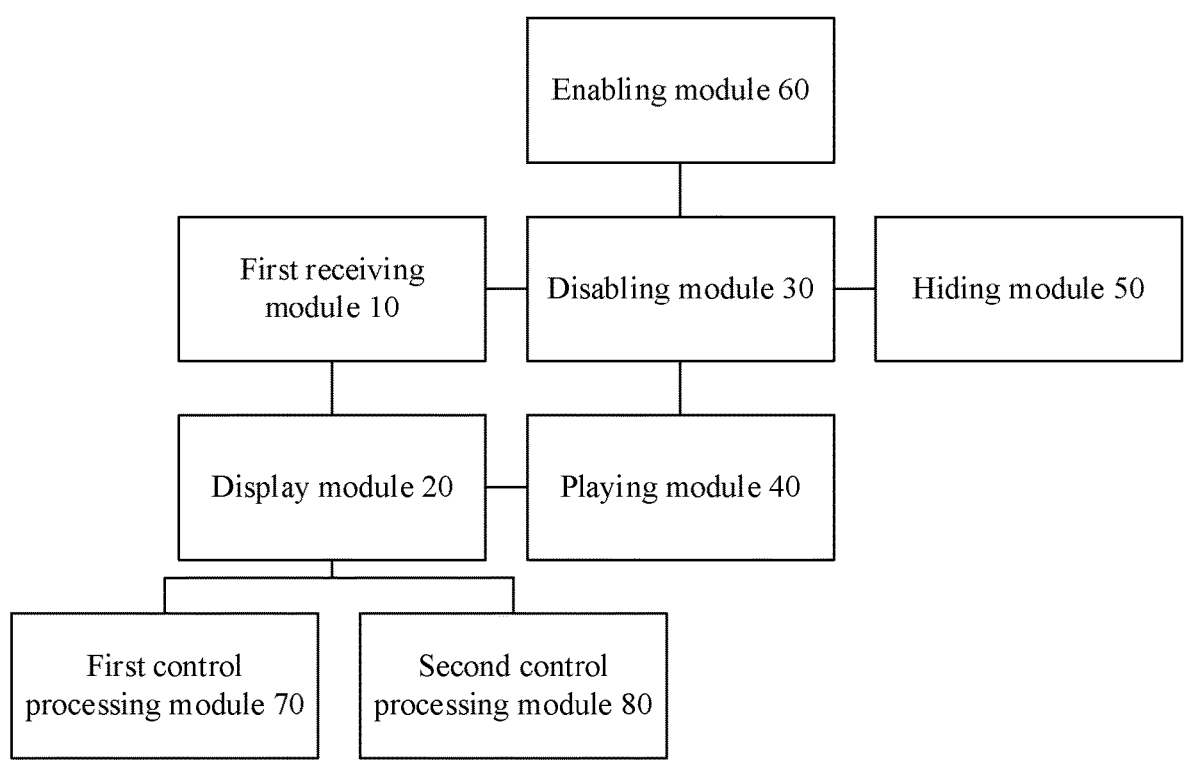
FIG. 9 is a structural block diagram of a device for controlling a hotspot recommendation pop-up window according to another embodiment of the present disclosure.

FIG. 9 is a structural block diagram of a device for controlling a hotspot recommendation pop-up window according to another embodiment of the present disclosure. As shown in FIG. 9, the device further includes: a first control processing module 70. The first control processing module 70 is configured to reduce a transparency of the interaction control and a transparency of the display control to a preset threshold in a case that the pop-up window is displayed on the hot video playing page.

In an embodiment, as shown in FIG. 9, the device further includes a second control processing module 80. The second control processing module 80 is configured to move the interaction control and the display control out of the hot video playing page along preset movement trajectories in a case that the pop-up window is displayed on the hot video playing page.

In an embodiment, the prompt options may be displayed in the pop-up window in a horizontally scrolled manner or vertically scrolled manner. The prompt options each includes a video prompt image or text prompt content corresponding to a hotspot.

In an embodiment, the device further includes: a first hot video switching module (not shown) and/or a second hot video switching module (not shown). The first hot video switching module is configured to control, on reception of a preset sliding-up gesture instruction on the video control when the pop-up window is hidden, the video control to play a last hot video in a hotspot to which a currently played hot video belongs. The second hot video switching module is configured to control, on reception of a preset sliding-down gesture instruction on the video control when the pop-up window is hidden, the video control to play a next hot video in the hotspot to which the currently played hot video belongs.

Figure 10:
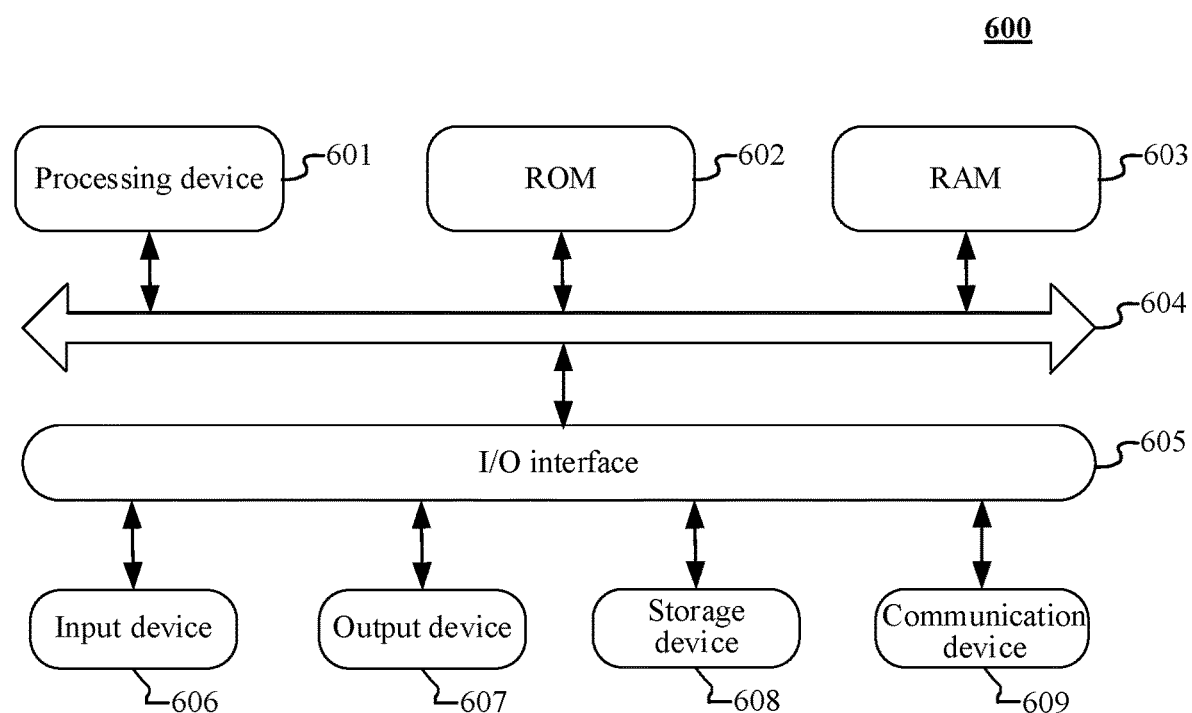
FIG. 10 is a schematic diagram of an electronic device according to an embodiment of the present disclosure.

Next, referring to FIG. 10, FIG. 10 is a schematic structural diagram of an electronic device 600 according to an embodiment of the present disclosure. The terminal device in the embodiments of the present disclosure may include, but is not limited to, mobile terminals such as mobile phones, notebook computers, digital broadcast receivers, Personal Digital Assistants (PDAs), Tablets (PADs), Portable Multimedia Players (PMPs), vehicle-mounted terminals (for example, in-vehicle navigation terminals), and stationary terminals such as digital TVs, desktop computers. The electronic device shown in FIG. 10 is only an example, and should not impose any limitation on the function and usage scope of the embodiments of the present disclosure.

As shown in FIG. 10, an electronic device 600 may include a processing device 601 (for example, a central processing unit, a graphics processor) that may perform various appropriate actions and processes based on the program stored in a read only memory (ROM) 602 or a program loaded into a random access memory (RAM) 603 from a storage device 608. In the RAM 603, various programs and data necessary for the operation of the electronic device 600 are also stored. The processing device 601, the ROM 602, and the RAM 603 are connected to each other through a bus 604. An input/output (I/O) interface 605 is also connected to bus 604.

Generally, the following devices may be connected to the I/O interface 605: an input devices 606 including, for example, a touch screen, a touchpad, a keyboard, a mouse, a camera, a microphone, an accelerometer, a gyroscope, and the like; an output device 607 including, for example, a liquid crystal display (LCD), a speaker, a vibrator, and the like; a storage device 608 including, for example, a magnetic tape, a hard disk, and the like; and a communication device 609. The communication device 609 may allow the electronic device 600 to communicate wirelessly or by wire with other devices to exchange data. While FIG. 10 shows the electronic device 600 having various means, it should be understood that not all of the illustrated means are required to be implemented or provided. Alternatively, more or fewer devices may be implemented or provided.

In particular, according to the embodiments of the present disclosure, the processes described above with reference to the flowcharts may be implemented as computer software programs. For example, a computer program product is provided according to an embodiment of the present disclosure, which includes a computer program carried on a non-transitory computer readable medium, the computer program contains program codes for performing the method illustrated in the flowchart. In such an embodiment, the computer program may be downloaded from the network via the communication device 609, or installed from the storage device 608 or the ROM 602. When the computer program is executed by the processing device 601, the above-mentioned functions defined in the method according to the embodiments of the present disclosure are implemented.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage medium may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In this present disclosure, a computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave with computer-readable program code embodied thereon. Such propagated data signal may take a variety of forms, including but not limited to electromagnetic signals, optical signals, or any suitable combination thereof. The computer-readable signal medium may also be any computer-readable medium other than the computer-readable storage medium, and can transmit, propagate, or transport the program for use by or in connection with the instruction execution system, apparatus, or device. Program codes embodied on a computer readable medium may be transmitted using any suitable medium including, but not limited to, electrical wire, optical fiber cable, RF (radio frequency), and the like, or any suitable combination thereof.

In some embodiments, the client or server may communicate using any currently known or future developed network protocol, such as HyperText Transfer Protocol (HTTP), and may interconnect with digital data communication (for example, communication network) in any form or medium. Examples of communication networks include local area networks (LAN), wide area networks (WAN), the network (for example, the Internet), and peer-to-peer networks (for example, ad hoc peer-to-peer networks), as well as any currently known or future development networks.

The above-mentioned computer-readable medium may be included in the above-mentioned electronic device, or may exist alone without being assembled into the electronic device.

The above-mentioned computer-readable medium carries one or more programs, and the one or more programs, when executed by the electronic device, cause the electronic device to perform steps of: receiving a pop-up window display instruction, where the pop-up window display instruction is generated in response to a click instruction received in a more hotspot prompt area on a hot video playing page; displaying a pop-up window on the hot video playing page, where the pop-up window includes prompt options each of which corresponds to a hotspot; setting a first control on the hot video playing page except for the pop-up window to a disabled state, where the first control includes a video control for playing a hot video on the hot video playing page, an interaction control and a display control for displaying information of the hot video; and playing, on reception of a selection instruction from a user to select a target hotspot in the prompt options, a hot video in the target hotspot by using the video control on the hot video playing page.

Computer program codes for performing operations of the present disclosure may be written in one or more programming languages, including but not limited to object-oriented programming languages, such as Java, Smalltalk, C++, and conventional procedural programming languages, such as the "C" language or similar programming languages. The program codes may be executed entirely or partly on a computer of a user, executed as a stand-alone software package, executed partly on the computer of the user and partly on a remote computer, or entirely on the remote computer or server. In the case of a remote computer, the remote computer may be connected to the computer of the user through any kind of network, including a local area network (LAN) or a wide area network (WAN), or may be connected to an external computer (for example, via an Internet connection provided by an Internet service provider).

The flowchart and block diagrams in the drawings illustrate the architecture, functionality, and operation of possible implementations of systems, methods and computer program products according to the embodiments of the present disclosure. In this regard, each block in the flowchart or block diagrams may represent a module, a segment, or a portion of code that contains executable instructions for implementing the specified logical functions. It should also be noted that, in some alternative implementations, the functions noted in the blocks may be executed out of the order noted in the figures. For example, two blocks shown in succession may, in fact, be executed substantially concurrently, or may be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or may be implemented in a combination of dedicated hardware and computer instructions.

The modules involved in the embodiments of the present disclosure may be implemented in software or hardware. The name of the module does not constitute a limitation of the module itself under certain circumstances, for example, the first receiving module may also be described as "a module that receives a pop-up window display instruction".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. the machine-readable medium may include, but is not limited to, electronic, magnetic, optical, electromagnetic, infrared, or semiconductor systems, apparatuses, or devices, or any suitable combination thereof. More specific examples of machine-readable storage medium may include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, in an example 1, a method for controlling a hotspot recommendation pop-up window is provided, which includes: receiving a pop-up window display instruction, where the pop-up window display instruction is generated in response to a click instruction received in a more hotspot prompt area on a hot video playing page; displaying a pop-up window on the hot video playing page, where the pop-up window includes prompt options each of which corresponds to a hotspot; setting a first control on the hot video playing page except for the pop-up window to a disabled state, where the first control includes a video control for playing a hot video on the hot video playing page, an interaction control and a display control for displaying information of the hot video; and playing, on reception of a selection instruction from a user to select a target hotspot in the prompt options, a hot video in the target hotspot on the hot video playing page by using the video control.

According to one or more embodiments of the present disclosure, in an example 2, the method of example 1 further includes: hiding the pop-up window on reception of a pop-up window hiding instruction, where the pop-up window hiding instruction is generated in response to a click instruction received on the first control in the disabled state, or generated in response to a preset gesture instruction received in the pop-up window; and setting, in response to the pop-up window hiding instruction, the first control to an enabled state.

According to one or more embodiments of the present disclosure, in an example 3, the method of example 1 or example 2 further includes: reducing a transparency of the interaction control and a transparency of the display control to a preset threshold in a case that the pop-up window is displayed on the hot video playing page.

According to one or more embodiments of the present disclosure, in an example 4, the method of example 1 or example 2 further includes: moving the interaction control and the display control out of the hot video playing page along preset movement trajectories in a case that the pop-up window is displayed on the hot video playing page.

According to one or more embodiments of the present disclosure, in an example 5, in the method of example 1 or example 2, the prompt options are displayed in the pop-up window in a horizontally scrolled manner or vertically scrolled manner, and the prompt options each includes a video prompt image or text prompt content corresponding to a hotspot.

According to one or more embodiments of the present disclosure, in an example 6, the method of example 1 or example 2, the method further includes: controlling, on reception of a preset sliding-up gesture instruction on the video control when the pop-up window is hidden, the video control to play a last hot video in a hotspot to which a currently played hot video belongs; and/or controlling, on reception of a preset sliding-down gesture instruction on the video control when the pop-up window is hidden, the video control to play a next hot video in the hotspot to which the currently played hot video belongs.

According to one or more embodiments of the present disclosure, in an example 7, a device for controlling a hotspot recommendation pop-up window is provided, which includes a first receiving module, a display module, a disabling module, and a playing module. The first receiving module is configured to receive a pop-up window display instruction, where the pop-up window display instruction is generated in response to a click instruction received in a more hotspot prompt area on a hot video playing page. The display module is configured to display a pop-up window on the hot video playing page, where the pop-up window includes prompt options each of which corresponds to a hotspot. The disabling module is configured to set a first control on the hot video playing page except for the pop-up window to a disabled state, where the first control includes a video control for playing a hot video on the hot video playing page, an interaction control and a display control for displaying information of the hot video. The playing module is configured to play, on reception of a selection instruction from a user to select a target hotspot in the prompt options, a hot video in the target hotspot on the hot video playing page by using the video control.

According to one or more embodiments of the present disclosure, in an example 8, the device of example 7 further includes a hiding module and an enabling module. The hiding module is configured to hide the pop-up window on reception of a pop-up window hiding instruction, where the pop-up window hiding instruction is generated in response to a click instruction received on the first control in the disabled state, or generated in response to a preset gesture instruction received in the pop-up window. The enabling module is configured to set, in response to the pop-up window hiding instruction, the first control to an enabled state.

According to one or more embodiments of the present disclosure, in an example 9, a computer-readable medium is provided, which includes a computer program stored thereon. The computer program, when executed by a processing device, performs the steps of the method described in any one of the examples 1 to 6.

According to one or more embodiments of the present disclosure, in an example 10, an electronic device is provided, which includes a storage device and a processing device. The storage device is configured to store a computer program. The processing device is configured to execute the computer program in the storage device, to perform steps of the method described in any one of the examples 1 to 6.

The above description merely illustrates the embodiments of the present disclosure and the technical principles employed. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the present disclosure (but not limited to) with similar functions.

Additionally, although operations are described in a particular order, this should not be construed that the operations are performed in the particular order shown or in a sequential order. Under certain circumstances, multitasking and parallel processing may be advantageous. Although several implementation-specific details are described above, these should not be construed as limitations on the scope of the present disclosure. Certain features that are described in the context of a single embodiment may also be applied in a single embodiment. Conversely, features that are described in the context of a single embodiment may also be applied in multiple embodiments separately or in any suitable sub combination.

Although the subject matter has been described in language specific to structural features and/or method logical acts, it is to be understood that the subject matter defined in the claims is not necessarily limited to the specific features or acts described above. Rather, the specific features and acts described above are merely example forms of implementing the claims. Regarding the device in the above embodiment, the specific manner in which each module performs operations has been described in detail in the embodiment of the method, and will not be described in detail here.

The invention claimed is:

1. A method for controlling a hotspot recommendation pop-up window, comprising:
receiving a pop-up window display instruction, wherein the pop-up window display instruction is generated in response to a click instruction received in a more hotspot prompt area on a hot video playing page;
displaying a pop-up window on the hot video playing page, wherein the pop-up window comprises prompt options each of which corresponds to a hotspot;
setting a first control on the hot video playing page except for the pop-up window to a disabled state, wherein the first control comprises a video control for playing a hot video on the hot video playing page, an interaction control and a display control for displaying information of the hot video;
receiving a selection instruction from a user to select a target hotspot from the prompt options;
playing, on reception of the selection instruction, a hot video in the target hotspot by using the video control on the hot video playing page, and
wherein the method further comprises moving the interaction control and the display control out of the hot video playing page respectively along preset movement trajectories for each of the interaction control and the display control in a case that the pop-up window is displayed on the hot video playing page.

2. The method according to claim 1, further comprising:
receiving a pop-up window hiding instruction, wherein the pop-up window hiding instruction is generated in response to receiving a click instruction on the first control in the disabled state, or generated in response to receiving a preset gesture instruction in the pop-up window;
hiding the pop-up window on reception of the pop-up window hiding instruction; and
setting the first control to an enabled state in response to receiving the pop-up window hiding instruction.

3. The method according to claim 2, further comprising:
reducing a transparency of the interaction control and a transparency of the display control to a preset threshold in a case that the pop-up window is displayed on the hot video playing page.

4. The method according to claim 2, wherein the prompt options are displayed in the pop-up window in a horizontally scrolled manner or vertically scrolled manner, and
the prompt options each comprises a video prompt image or text prompt content corresponding to a hotspot.

5. The method according to claim 2, further comprising:
receiving a preset sliding-up gesture instruction on the video control when the pop-up window is hidden; and
on reception of the preset sliding-up gesture instruction, controlling the video control to play a last hot video in a hotspot to which a currently played hot video belongs, or controlling the video control to play a next hot video in the hotspot to which the currently played hot video belongs.

6. The method according to claim 1, further comprising:
reducing a transparency of the interaction control and a transparency of the display control to a preset threshold in a case that the pop-up window is displayed on the hot video playing page.

7. The method according to claim 1, wherein the prompt options are displayed in the pop-up window in a horizontally scrolled manner or vertically scrolled manner, and
the prompt options each comprises a video prompt image or text prompt content corresponding to a hotspot.

8. The method according to claim 1, further comprising:
receiving a preset sliding-up gesture instruction on the video control when the pop-up window is hidden; and
on reception of the preset sliding-up gesture instruction, controlling the video control to play a last hot video in a hotspot to which a currently played hot video belongs, or controlling the video control to play a next hot video in the hotspot to which the currently played hot video belongs.

9. A device for controlling a hotspot recommendation pop-up window, comprising:
one or more processors; and
a memory configured to store one or more programs;
wherein when the one or more programs are executed by the one or more processors, the one or more processors are caused to perform operations of:
receiving a pop-up window display instruction, wherein the pop-up window display instruction is generated in response to a click instruction received in a more hotspot prompt area on a hot video playing page;
displaying a pop-up window on the hot video playing page, wherein the pop-up window comprises prompt options each of which corresponds to a hotspot;
setting a first control on the hot video playing page except for the pop-up window to a disabled state, wherein the first control comprises a video control for playing a hot video on the hot video playing page, an interaction control and a display control for displaying information of the hot video;
receiving a selection instruction from a user to select a target hotspot from the prompt options;
playing, on reception of the selection instruction, a hot video in the target hotspot by using the video control on the hot video playing page; and
wherein the operations further comprise moving the interaction control and the display control out of the hot video playing page respectively along preset movement trajectories for each of the interaction control and the display control in a case that the pop-up window is displayed on the hot video playing page.

10. The device according to claim 9, the one or more processors, the one or more processors are further caused to perform operations of:
receiving a pop-up window hiding instruction, wherein the pop-up window hiding instruction is generated in response to receiving a click instruction on the first control in the disabled state, or generated in response to receiving a preset gesture instruction in the pop-up window;
hiding the pop-up window on reception of the pop-up window hiding instruction; and
setting the first control to an enabled state in response to receiving the pop-up window hiding instruction.

11. The device according to claim 9, the one or more processors, the one or more processors are further caused to perform operations of:
reducing a transparency of the interaction control and a transparency of the display control to a preset threshold in a case that the pop-up window is displayed on the hot video playing page.

12. The device according to claim 9, wherein the prompt options are displayed in the pop-up window in a horizontally scrolled manner or vertically scrolled manner, and
the prompt options each comprises a video prompt image or text prompt content corresponding to a hotspot.

13. The device according to claim 9, the one or more processors, the one or more processors are further caused to perform operations of:
receiving a preset sliding-up gesture instruction on the video control when the pop-up window is hidden; and
on reception of the preset sliding-up gesture instruction, controlling the video control to play a last hot video in a hotspot to which a currently played hot video belongs, or controlling the video control to play a next hot video in the hotspot to which the currently played hot video belongs.

14. A non-transitory computer-readable medium, comprising a computer program stored thereon, wherein the computer program, when executed by a processing device, performs operations of:
receiving a pop-up window display instruction, wherein the pop-up window display instruction is generated in response to a click instruction received in a more hotspot prompt area on a hot video playing page;
displaying a pop-up window on the hot video playing page, wherein the pop-up window comprises prompt options each of which corresponds to a hotspot;
setting a first control on the hot video playing page except for the pop-up window to a disabled state, wherein the first control comprises a video control for playing a hot video on the hot video playing page, an interaction control and a display control for displaying information of the hot video;
receiving a selection instruction from a user to select a target hotspot from the prompt options;
playing, on reception of the selection instruction, a hot video in the target hotspot by using the video control on the hot video playing page; and
wherein the operations further comprise moving the interaction control and the display control out of the hot video playing page respectively along preset movement trajectories for each of the interaction control and the display control in a case that the pop-up window is displayed on the hot video playing page.

15. The non-transitory computer-readable medium of claim 14, the operations further comprise:
receiving a pop-up window hiding instruction, wherein the pop-up window hiding instruction is generated in response to receiving a click instruction on the first control in the disabled state, or generated in response to receiving a preset gesture instruction in the pop-up window;

hiding the pop-up window on reception of the pop-up window hiding instruction; and setting the first control to an enabled state in response to receiving the pop-up window hiding instruction.

16. The non-transitory computer-readable medium of claim 14, the operations further comprise:

reducing a transparency of the interaction control and a transparency of the display control to a preset threshold in a case that the pop-up window is displayed on the hot video playing page.

17. The non-transitory computer-readable medium of claim 14, wherein the prompt options are displayed in the pop-up window in a horizontally scrolled manner or vertically scrolled manner, and wherein the prompt options each comprises a video prompt image or text prompt content corresponding to a hotspot.

18. The non-transitory computer-readable medium of claim 14, the operations further comprise:

receiving a preset sliding-up gesture instruction on the video control when the pop-up window is hidden; and on reception of the preset sliding-up gesture instruction, controlling the video control to play a last hot video in a hotspot to which a currently played hot video belongs, or controlling the video control to play a next hot video in the hotspot to which the currently played hot video belongs.

* * * * *